(12) United States Patent
Lu et al.

(10) Patent No.: US 11,766,942 B2
(45) Date of Patent: Sep. 26, 2023

(54) EXTENDED-RANGE FUEL CELL ELECTRIC VEHICLE POWER DEVICE AND CONTROL METHOD THEREFOR

(71) Applicant: NANJING XIAOZHUANG UNIVERSITY, Nanjing (CN)

(72) Inventors: Yuzheng Lu, Nanjing (CN); Senlin Yan, Nanjing (CN); Ligang Ma, Nanjing (CN)

(73) Assignee: NANJING XIAOZHUANG UNIVERSITY, Nanjing (CN)

( * ) Notice: Subject to any disclaimer, the term of this patent is extended or adjusted under 35 U.S.C. 154(b) by 845 days.

(21) Appl. No.: 16/753,772

(22) PCT Filed: Apr. 1, 2019

(86) PCT No.: PCT/CN2019/080787
§ 371 (c)(1),
(2) Date: Apr. 4, 2020

(87) PCT Pub. No.: WO2019/192420
PCT Pub. Date: Oct. 10, 2019

(65) Prior Publication Data
US 2020/0282844 A1    Sep. 10, 2020

(30) Foreign Application Priority Data
Apr. 4, 2018 (CN) .......................... 201810298605.1

(51) Int. Cl.
*B60L 15/20* (2006.01)
*B60L 50/60* (2019.01)
(Continued)

(52) U.S. Cl.
CPC ............ *B60L 15/2045* (2013.01); *B60K 1/00* (2013.01); *B60K 26/02* (2013.01); *B60L 50/60* (2019.02);
(Continued)

(58) Field of Classification Search
CPC ...... B60L 15/2045; B60L 50/60; B60L 50/70; B60L 50/75; B60L 2210/00;
(Continued)

(56) References Cited

U.S. PATENT DOCUMENTS

| 10,666,045 B2 * | 5/2020 | Gemin ..................... B60L 50/51 |
| 2008/0265812 A1 * | 10/2008 | Adra ....................... B60L 50/11 |
| | | 318/375 |

(Continued)

*Primary Examiner* — Richard M Camby
(74) *Attorney, Agent, or Firm* — CBM PATENT CONSULTING, LLC

(57) ABSTRACT

An extended-range fuel cell electric vehicle power device includes a driving motor, a bidirectional converter, a chopper, a power cell, a fuel cell, a high-pressure hydrogen storage tank, an electric control valve, a controller, an accelerator pedal and a brake pedal. An output of the driving motor is connected to a transmission shaft of an electric vehicle through a speed change gearbox, and an input of the driving motor is connected to an alternating current output end of the bidirectional converter; a direct current input end of the bidirectional converter is connected in parallel to an output of the power cell and an output of the chopper, and an input of the chopper is connected to a power source output of the fuel cell.

7 Claims, 3 Drawing Sheets

(51) Int. Cl.
*B60L 50/70* (2019.01)
*B60L 50/75* (2019.01)
*B60K 1/00* (2006.01)
*B60K 26/02* (2006.01)
*G06N 3/08* (2023.01)
*H01M 8/04082* (2016.01)
*B60K 6/28* (2007.10)

(52) U.S. Cl.
CPC ............... *B60L 50/70* (2019.02); *B60L 50/75* (2019.02); *G06N 3/08* (2013.01); *H01M 8/04201* (2013.01); *B60K 6/28* (2013.01); *B60L 2210/00* (2013.01); *B60L 2250/26* (2013.01); *B60L 2260/46* (2013.01); *B60Y 2200/91* (2013.01); *B60Y 2200/92* (2013.01); *B60Y 2400/112* (2013.01); *B60Y 2400/202* (2013.01); *H01M 2250/20* (2013.01)

(58) Field of Classification Search
CPC .. B60L 2250/26; B60L 2260/46; B60L 58/40; B60L 2250/28; B60L 2260/48; B60L 15/20; B60L 50/61; B60L 58/30; B60K 1/00; B60K 26/02; B60K 6/28; B60K 2001/001; G06N 3/08; G06N 3/084; H01M 8/04201; H01M 2250/20; H01M 8/1007; H01M 2220/20; H01M 10/0525; H01M 16/006; B60Y 2200/91; B60Y 2200/92; B60Y 2400/112; B60Y 2400/202; Y02E 60/10; Y02E 60/50; Y02T 10/62; Y02T 10/70; Y02T 10/72; Y02T 90/40; B60W 20/00; B60W 2710/083; B60W 2710/28
See application file for complete search history.

(56) References Cited

U.S. PATENT DOCUMENTS

| | | | |
|---|---|---|---|
| 2010/0090525 A1* | 4/2010 | King | B60L 58/20 180/65.265 |
| 2013/0038127 A1* | 2/2013 | King | B60L 58/20 307/64 |
| 2013/0134911 A1* | 5/2013 | Kanakasabai | B60L 50/40 318/400.3 |
| 2015/0263517 A1* | 9/2015 | Gemin | B60L 50/30 307/77 |
| 2016/0082844 A1* | 3/2016 | King | H02M 3/158 307/10.1 |
| 2017/0133969 A1* | 5/2017 | Kanakasabai | B60L 50/40 |
| 2019/0222022 A1* | 7/2019 | Gemin | H02J 7/00 |

* cited by examiner

EXTENDED-RANGE FUEL CELL ELECTRIC VEHICLE POWER DEVICE AND CONTROL METHOD THEREFOR

TECHNICAL FIELD

The present invention relates to an electric vehicle energy management device and a control method therefor, and more particularly, to an extended-range fuel cell electric vehicle power device and a control method therefor.

BACKGROUND

An electric vehicle has received extensive attention internationally. At present, the most representative American Tesla electric vehicle has been sold in most countries in the world. The electric vehicle does not emit any harmful gas and greenhouse gas, but most worrying problems of the electric vehicle include a one-charge cruising ability, a charging duration, matching of charging facilities, etc. China is actively promoting the electric vehicle industry, but charging problems brought by rapid development of the electric vehicle are also serious. Academician Qingquan Chen, father of Asian electric vehicles, points out that: "there are three stages in development of the electric vehicle, wherein the first stage is a hybrid electric vehicle represented by Toyota Prius, and China has independently developed this type of electric vehicles currently; the second stage is a pure electric vehicle, China is currently in a vigorous development stage, and BYD, Beijing Automotive Group, etc. have launched many sorts of pure electric vehicles; and the third stage is a fuel cell electric vehicle, and a representative of internationally commercialized products is Toyota's Mira currently". A fuel cell efficiently converts chemical energy in fuel into electric energy, each fuel cell electric vehicle is like a small power station, which can generate electricity by itself, provide electric power needed by a vehicle, and provide electric power for other equipment when it is necessary.

From an international aspect, the fuel cell electric vehicle still has many problems. However, it is an important stage in the development of the electric vehicle that the fuel cell is used as auxiliary power and is combined with a chargeable electric vehicle to form an electric vehicle of comprehensive energy, and the fuel cell with a smaller installed capacity is used as a range extender to improve the cruising ability of the electric vehicle. A series topology structure is generally used in an extended-range electric vehicle, and the extended-range electric vehicle has a relatively simple structure, is one of hybrid electric vehicles, and is additionally provided with a set of fuel cell engines based on the pure electric vehicle for the purpose of increasing a driving distance of the vehicle, thus effectively solving the problems of a short driving distance and an insufficient cruising ability of the common pure electric vehicle. The fuel cell engine is used as a whole vehicle power system range extender and plays a role of standby energy source, while a power storage cell is used as a main energy source for vehicle driving. When electric energy of the power storage cell is insufficient or an output power is difficult to meet a requirement of a working condition, the range extender starts to work to charge the power storage cell or directly drive the vehicle, thus increasing the driving distance of the vehicle.

SUMMARY

Objects of the invention: aiming at the problems and defects in the prior art, the present invention is intended to provide an extended-range fuel cell electric vehicle power device and a control method therefor, wherein a fuel cell system is additionally provided based on a pure electric vehicle as a range extender to improve an cruising ability of the electric vehicle; on the other hand, a working state of a fuel cell is controlled by using an intelligent control scheme to realize energy-saving and emission-reduction effects.

Technical solutions: the present invention provides an extended-range fuel cell electric vehicle power device, the device includes a driving motor, a bidirectional converter, a chopper, a power cell, a fuel cell, a high-pressure hydrogen storage tank, an electric control valve, a controller, an accelerator pedal and a brake pedal, wherein:

an output of the driving motor is connected to a transmission shaft of an electric vehicle through a speed change gearbox, an input of the driving motor is connected to an alternating current output end of the bidirectional converter, a direct current input end of the bidirectional converter is connected in parallel to an output of the power cell and an output of the chopper, an input of the chopper is connected to a power source output of the fuel cell, a fuel inlet of the fuel cell is connected to an output of the high-pressure hydrogen storage tank through the electric control valve, an output of the controller is connected to a control port of the electric control valve and a control port of the bidirectional converter respectively, and an input end of the controller is connected to output signals of the accelerator pedal and the brake pedal respectively.

Preferably, the controller is a BP neural network controller, and a structure of a BP neural network is a 2-5-2 structure, which means that, 2 neurons are provided in an input layer, 5 neurons are provided in a middle layer, and 2 neurons are provided in an output layer; and the input layer is used for signal transmission and outputs two controlled quantities $y_1$ and $y_2$.

Preferably, the power cell is a lithium ion cell.

The present invention further provides a method for controlling an extended-range fuel cell electric vehicle power device, wherein when a given power Pin is positive, an electric vehicle works in a driving state, when the given power Pin is negative, the electric vehicle works in a braking state, an actual output power Pout of a driving motor drives the electric vehicle, a signal of the actual output power Pout of the driving motor is fed back to an input end and compared with the given power Pin to form a feedback control system, the signal of the Pout and a signal of the Pin are inputted into a comparator to obtain a power error signal ΔP, and differentiation processing is performed on the power error signal ΔP to obtain a power change rate signal dP/dt, and two controlled quantities $y_1$ and $y_2$ are obtained from the ΔP and the dP/dt by a control algorithm, wherein the controlled quantity $y_1$ controls an opening degree of an electric control valve, thus controlling an output electric power of a fuel cell; and the controlled quantity $y_2$ controls a PWM signal of a control port of a bidirectional converter, thus controlling a working mode and a power of the bidirectional converter.

The controlling the working mode of the bidirectional converter includes controlling an inversion state when the electric vehicle works in the driving state and a rectification state when the electric vehicle works in the braking state; in the inversion state, the driving motor works in an electric state, and a power cell converts a direct current into an alternating current through the bidirectional converter to provide electric power for the driving motor; in the rectification state, the driving motor works in a power generation state and converts energy generated during braking of the electric vehicle into electric energy, and an alternating current generated by the driving motor is rectified into a direct current through the bidirectional converter to charge the power cell; and when a signal is generated by an accelerator pedal, the driving motor works in the power generation state, and when a signal is generated by a brake pedal, the driving motor works in the electric state.

Further, the control algorithm which is a BP neural network control algorithm includes the following steps of:

(1) Establishing a Structure of a BP Neural Network
wherein a structure of the BP neural network is a 2-5-2 structure, which means that, a number of neurons in an input layer is that i=1,2, $x_i$ corresponds to two input variables, and the input layer is used for signal transmission;

the first input variable is: $x_1$:ΔP;
the second input variable is: $x_2$:dP/dt;
a number of neurons in a middle layer is that j=1,2,3,4,5; and an input of the neurons in the middle layer is $x_j$ and an output of the neurons in the middle layer is $x'_j$;
a number of neurons in an output layer is that l=1,2, an input is $y_l$, and $y_l$ corresponds to two controlled quantities $y_1$ and $y_2$; and (2) Training the BP Network.
Preferably, the step (2) includes:
(21) forward propagation: calculating an output of the BP neural network,
wherein the input of the neurons in the middle layer is a weighted sum of all the inputs, namely:

$$x_j = \sum_{i=1}^{2} \omega_{ij} x_i; \qquad (1)$$

the output $x'_j$ of the neurons in the middle layer excites $x_j$ by using an S function to obtain:

$$x'_j = f(x_j) = \frac{1}{1+e^{-x}}; \qquad (2)$$

then:

$$\frac{\partial x'_j}{\partial x_j} = x'_j(1 - x'_j); \qquad (3)$$

the output of the neurons in the output layer is that:

$$y_l = \sum_{j}^{5} \omega_{jl} x'_j; \qquad (4)$$

an error between a $l^{th}$ output of the BP neural network and a corresponding ideal output $y_l^0$ is that:

$$e_l = y_l^0 - y_l \qquad (5);$$

taking a $p^{th}$ sample as an example, an error performance index function of the $p^{th}$ sample is that:

$$E_p = \frac{1}{2} \sum_{l=1}^{5} e_l^2; \qquad (6)$$

(22) backward propagation: adjusting weights among the layers by gradient descent,
wherein a learning algorithm of a connection weight $\omega_{jl}$ between the output layer and the middle layer is that:

$$\Delta \omega_{jl} = -\eta \frac{\partial E_p}{\partial \omega_{jl}} = \eta e_l \frac{\partial x_l}{\partial \omega_{jl}} = \eta e_l x'_j; \qquad (7)$$

wherein η is a learning rate, η∈[0,1]; and $\Delta \omega_{jl}$ is a variation of the connection weight $\omega_{jl}$ between the output layer and the middle layer;
a network weight at a moment k+1 is that:

$$\omega_{jl}(k+1) = \omega_{jl}(k) + \Delta \omega_{jl} \qquad (8);$$

a learning algorithm of a connection weight $\omega_{ij}$ between the middle layer and the input layer is that:

$$\Delta \omega_{ij} = -\eta \frac{\partial E_p}{\partial \omega_{ij}} = \eta \sum_{l=1}^{5} e_l \frac{\partial x_l}{\partial \omega_{ij}}; \qquad (9)$$

wherein $$\frac{\partial x_l}{\partial \omega_{ij}} = \frac{\partial x_l}{\partial x'_j} \cdot \frac{\partial x'_j}{\partial x_j} \cdot \frac{\partial x_j}{\partial \omega_{ij}} = \omega_{il} \cdot \frac{\partial x'_j}{\partial x_j} \cdot x_i = \omega_{il} \cdot x'_j(1 - x'_j) \cdot x_i,$$

and $\Delta \omega_{ij}$ is a variation of the connection weight $\omega_{ij}$ between the middle layer and the input layer; and
a network weight at a moment t+1 is that:

$$\omega_{ij}(k+1) = \omega_{ij}(k) + \Delta \omega_{ij} \qquad (10).$$

Beneficial effects: compared with the prior art, according to the present invention, the fuel cell system is additionally provided based on the pure electric vehicle to form the mild hybrid power system to improve the cruising ability of the electric vehicle, the improvement on the existing pure electric vehicle has a high practicability, and meanwhile, the small-capacity fuel cell system is applied to the vehicle, which lays a technical foundation for the future fuel cell electric vehicle; and moreover, according to the present invention, a working state of the fuel cell is controlled by using an intelligent control scheme to further realize energy-saving and emission-reduction effects.

DETAILED DESCRIPTION

The technical solutions of the present invention are further illustrated with reference to the drawings and the specific embodiments, it should be understood that these embodiments are only used for illustrating the present invention and are not intended to limit the scope of the present invention, and after reading the present invention, modifications of various equivalent forms of the present invention made by those skilled in the art all fall within the scope defined by the appended claims of the present application.

Figure 1:
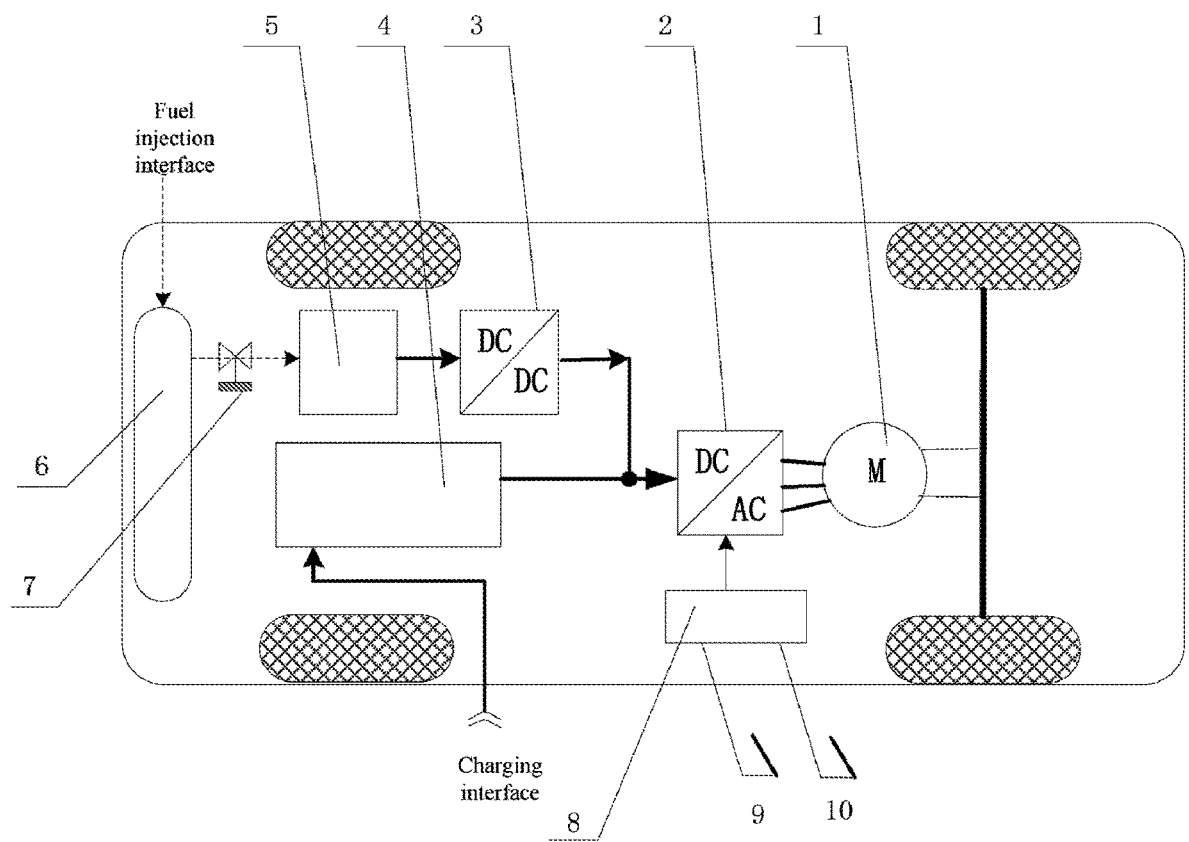
FIG. 1 is a structure diagram of the present invention.

As shown in FIG. 1, an extended-range fuel cell electric vehicle power device according to the present invention includes a driving motor 1, a bidirectional converter 2, a chopper 3, a power cell 4, a fuel cell 5, a high-pressure hydrogen storage tank 6, an electric control valve 7, a controller 8, an accelerator pedal 9 and a brake pedal 10.

An output of the driving motor is mechanical energy and is connected to a transmission shaft of an electric vehicle through a speed change gearbox, and an input of the driving motor is connected to an alternating current output end of the bidirectional converter. A direct current input end of the bidirectional converter is connected in parallel to an output of the power cell and an output of the chopper, an input of the chopper is connected to a power source output of the fuel cell, and a fuel inlet of the fuel cell is connected to an output of the high-pressure hydrogen storage tank, with the electric control valve connected therebetween. A control port of the electric control valve is connected to an output of the controller, and the output of the controller is also connected to a control port of the bidirectional converter to control a working state of the bidirectional converter. An input end of the controller is connected to output signals of the accelerator pedal and the brake pedal. The high-pressure hydrogen storage tank is provided with a fuel injection interface, and the power cell is provided with a charging interface.

The driving motor converts electric energy into mechanical energy to drive a vehicle.

Forward operation of the bidirectional converter inverts direct current energy of the power cell into direct current energy to provide the alternating current energy to the driving motor, and backward operation of the bidirectional converter charges the power cell with electric energy generated during braking of the driving motor to realize regenerative braking.

The chopper changes direct current energy of the fuel cell into a voltage range acceptable at a direct current input end of the bidirectional converter.

The power cell is used for storing electric power and may be a lithium ion cell and the like.

The fuel cell converts chemical energy into electric energy, and is equivalent to a small power generation device.

The high-pressure hydrogen storage tank is used for storing hydrogen.

The electric control valve is used for controlling a supply amount of the hydrogen.

The controller is composed of a high-performance chip and a peripheral circuit, collects the signals of the accelerator pedal and the brake pedal, and controls the working states of the electric control valve and the bidirectional converter. The controller may be TMS320F28335PGFA.

The accelerator pedal is used for controlling a vehicle speed, and the signal is transmitted to the input end of the controller.

The accelerator pedal is used for controlling a braking process of a vehicle, and the signal is transmitted to the input end of the controller.

Figure 2:
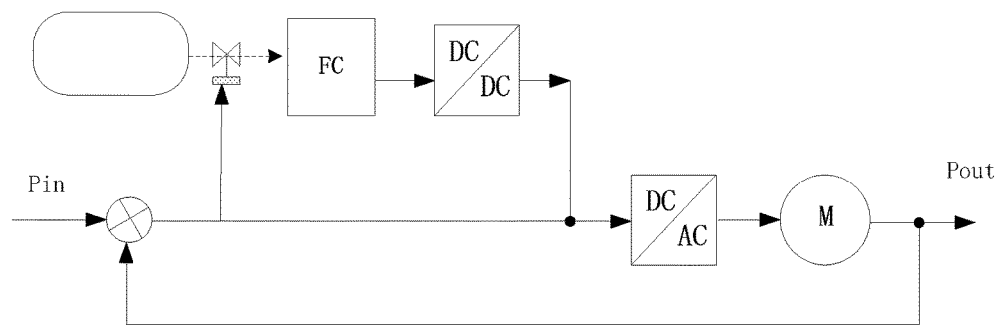
FIG. 2 is a diagram illustrating a control principle of the present invention.
Figure 3:
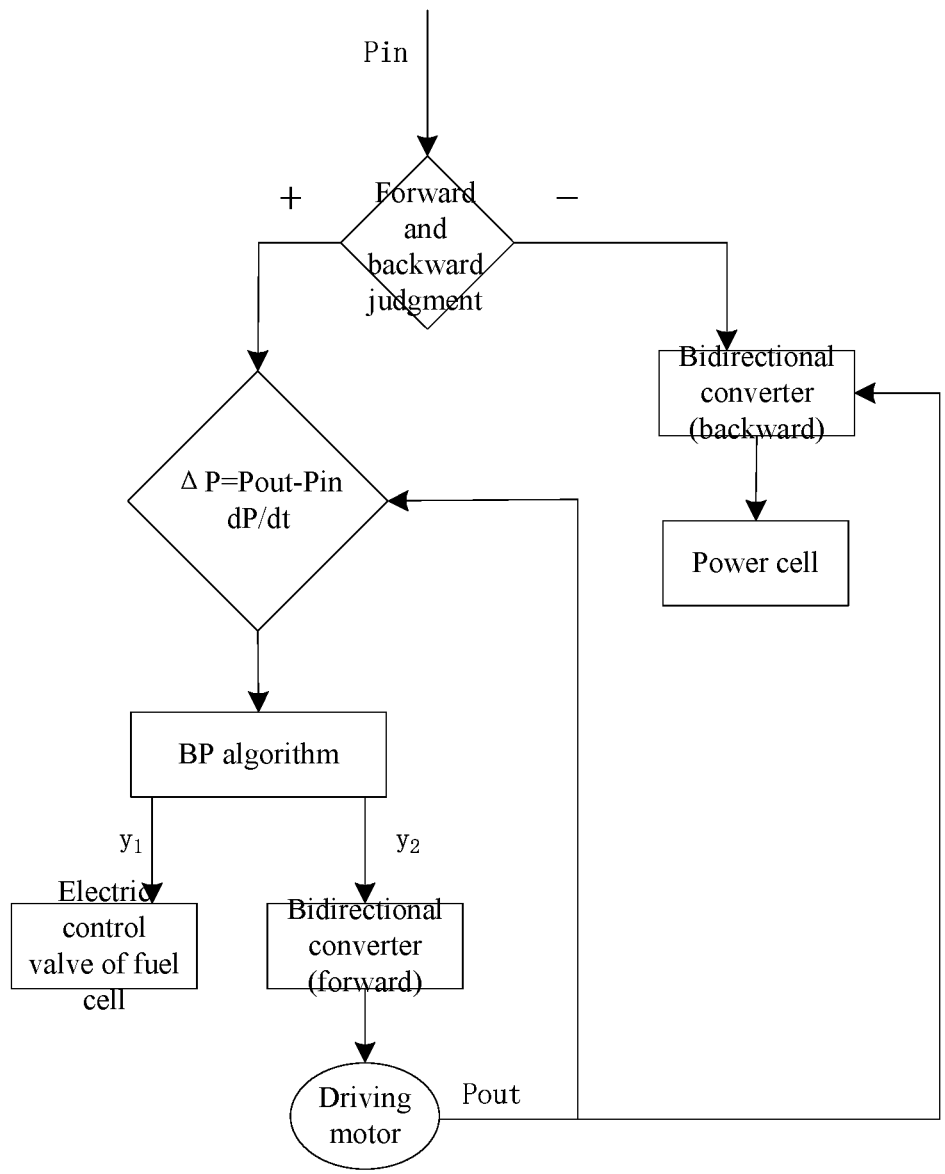
FIG. 3 is a flow chart illustrating energy control of an extended-range high-temperature fuel cell electric vehicle of the present invention.

A method for controlling an extended-range fuel cell electric vehicle power device according to the present invention is shown in FIG. 2, wherein a control scheme thereof is that: when a given power Pin is positive, an electric vehicle works in a driving state, when the given power Pin is negative, the electric vehicle works in a braking state, an actual output power Pout of a driving motor drives the electric vehicle, and a signal of the actual output power Pout of the driving motor is fed back to an input end and compared with the given power Pin to form a feedback control system. The signal of the Pout and a signal of the Pin are inputted into a comparator to obtain a power error signal $\Delta P$, and differentiation processing is performed on the power error signal $\Delta P$ to obtain a power change rate signal dP/dt, and two controlled quantities $y_1$ and $y_2$ are obtained from the $\Delta P$ and the dP/dt by a control algorithm, wherein the controlled quantity $y_1$ controls an opening degree of an electric control valve, thus controlling an output electric power of a fuel cell, and the controlled quantity $y_2$ controls a PWM (pulse width modulation) signal of a control port of a bidirectional converter, thus controlling a working mode and a power of the bidirectional converter. An energy control flow chart of an extended-range high-temperature fuel cell electric vehicle is shown in FIG. 3.

The controlling the working mode of the bidirectional converter includes controlling an inversion state when the electric vehicle works in the driving state and a rectification state when the electric vehicle works in the braking state. In the inversion state, the driving motor works in an electric state, and a power cell converts a direct current into an alternating current through the bidirectional converter to provide electric power for the driving motor. In the rectification state, the driving motor works in a power generation state and converts energy generated during braking of the electric vehicle into electric energy, and an alternating current generated by the driving motor is rectified into a direct current through the bidirectional converter to charge the power cell. When a signal is generated by an accelerator pedal, the driving motor works in the power generation state, and when a signal is generated by a brake pedal, the driving motor works in the electric state.

A BP neural network is used for control in the control algorithm above, and a learning ability of the BP neural network is used to learn a relationship between the driving motor and actions of the power cell, the fuel cell and a driver, so that corresponding control signals can be made quickly and accurately to control the driving motor.

Figure 4:
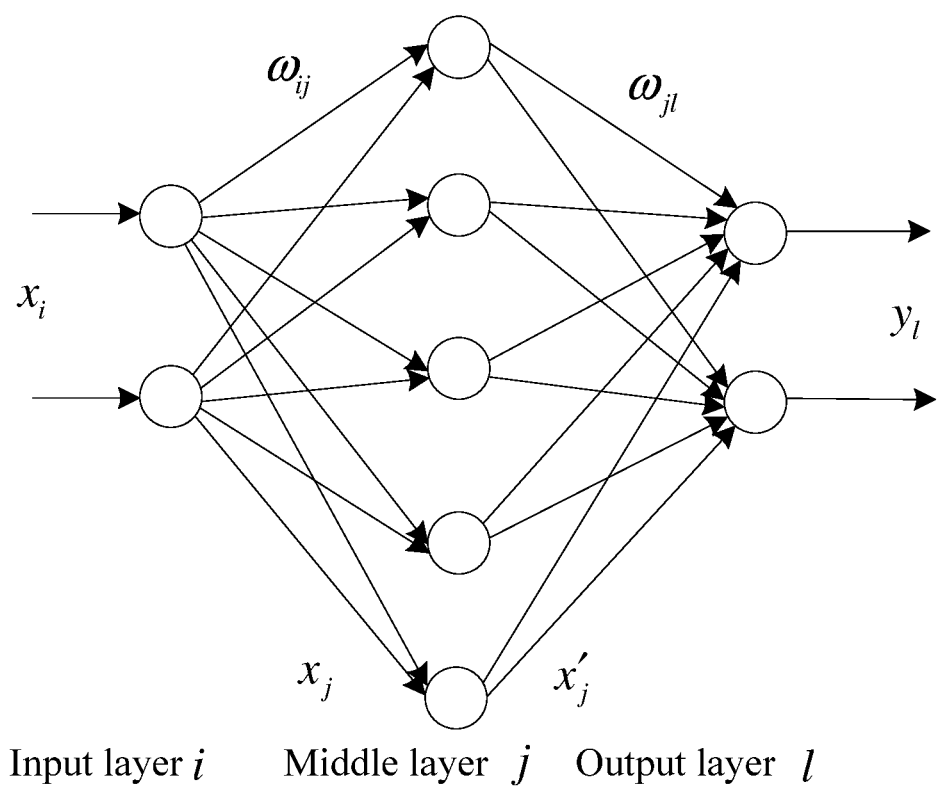
FIG. 4 is a schematic diagram illustrating a control structure a PB neural network of the present invention.

As shown in FIG. 4, a structure of the BP neural network is a 2-5-2 structure, which means that, a number of neurons in an input layer is that i=1,2, $x_i$ corresponds to two input variables, and the input layer is used for signal transmission;

the first input variable is: $x_1$:$\Delta P$;

the second input variable is: $x_2$:dP/dt;

a number of neurons in a middle layer is that j=1,2,3,4,5; and an input of the neurons in the middle layer is $x_j$ and an output of the neurons in the middle layer is $x'_j$; and a number of neurons in an output layer is that l=1,2, an input is $y_l$, and $y_l$ corresponds to two controlled quantities $y_1$ and $y_2$.

After the structure of the BP neural network is established, the BP network is trained next, and a specific training process is as follows.

Forward propagation refers to transmitting an input signal from the input layer to the middle layer and then to the output layer, and if the output layer obtains the expected output, the learning algorithm is finished; otherwise, the signal turns to backward propagation.

A specific network learning algorithm includes:
(1) forward propagation: calculating an output of a network,
wherein the input of the neurons in the middle layer is a weighted sum of all the inputs, namely:

$$x_j = \sum_{i=1}^{2} \omega_{ij} x_i; \qquad (1)$$

the output $x'_j$ of the neurons in the middle layer excites $x_j$ by using an S function to obtain:

$$x'_j = f(x_j) = \frac{1}{1+e^{-x}}; \qquad (2)$$

then:

$$\frac{\partial x'_j}{\partial x_j} = x'_j(1-x'_j); \qquad (3)$$

the output of the neurons in the output layer is that:

$$y_l = \sum_{j}^{5} \omega_{jl} x'_j; \qquad (4)$$

an error between a $l^{th}$ output of the BP neural network and a corresponding ideal output $y_l^0$ is that:

$$e_l = y_l^0 - y_l \qquad (5);$$

taking a $p^{th}$ sample as an example, an error performance index function of the $p^{th}$ sample is that:

$$E_p = \frac{1}{2}\sum_{l=1}^{5} e_l^2; \qquad (6)$$

(2) backward propagation: adjusting weights among the layers by gradient descent,
wherein a learning algorithm of a connection weight $\omega_{jl}$ between the output layer and the middle layer is that:

$$\Delta\omega_{jl} = -\eta \frac{\partial E_p}{\partial \omega_{jl}} = \eta e_l \frac{\partial x_l}{\partial \omega_{jl}} = \eta e_l x'_j; \qquad (7)$$

wherein $\eta$ is a learning rate, $\eta \in [0,1]$;
a network weight a ta moment k+1 is that:

$$\omega_{jl}(k+1) = \omega_{jl}(k) + \Delta\omega_{jl} \qquad (8);$$

a learning algorithm of a connection weight $\omega_{ij}$ between the middle layer and the input layer is that:

$$\Delta\omega_{ij} = -\eta \frac{\partial E_p}{\partial \omega_{ij}} = \eta \sum_{l=1}^{5} e_l \frac{\partial x_l}{\partial \omega_{ij}}; \qquad (9)$$

wherein $$\frac{\partial x_l}{\partial \omega_{ij}} = \frac{\partial x_l}{\partial x'_j} \cdot \frac{\partial x'_j}{\partial x_j} \cdot \frac{\partial x_j}{\partial \omega_{ij}} = \omega_{il} \cdot \frac{\partial x'_j}{\partial x_j} \cdot x_i = \omega_{il} \cdot x'_j(1-x'_j) \cdot x_i;$$

and
a network weight at a moment t+1 is that:

$$\omega_{ij}(k+1) = \omega_{ij}(k) + \Delta\omega_{ij} \qquad (10).$$

Finishing controller structure design and learning algorithm design based on the steps (1) and (2) above can realize control by the BP neural network, and required samples can be obtained from experiments. A large amount of sample data recorded in test of a vehicle can be used as training samples. The neural network controller cannot be directly used after designing, and the sample data is needed to train and learn use of fuel materials. The designed control method needs samples for training, and the sample data comes from samples obtained during the actual test of the vehicle.

What is claimed is:

1. An extended-range fuel cell electric vehicle power device, comprising a driving motor (1), a bidirectional converter (2), a chopper (3), a power cell (4), a fuel cell (5), a high-pressure hydrogen storage tank (6), an electric control valve (7), a controller (8), an accelerator pedal (9) and a brake pedal (10), wherein:
an output of the driving motor is connected to a transmission shaft of an electric vehicle through a speed change gearbox, an input of the driving motor is connected to an alternating current output end of the bidirectional converter, a direct current input end of the bidirectional converter is connected in parallel to an output of the power cell and an output of the chopper, an input of the chopper is connected to a power source output of the fuel cell, a fuel inlet of the fuel cell is connected to an output of the high-pressure hydrogen storage tank through the electric control valve, an output of the controller is connected to a control port of the electric control valve and a control port of the bidirectional converter respectively, and an input end of the controller is connected to output signals of the accelerator pedal and the brake pedal respectively.

2. The extended-range fuel cell electric vehicle power device according to claim 1, wherein the controller is a BP neural network controller, and a structure of a BP neural network is a 2-5-2 structure, which means that, 2 neurons are provided in an input layer, 5 neurons are provided in a middle layer, and 2 neurons are provided in an output layer; and the input layer is used for signal transmission and outputs two controlled quantities $y_1$ and $y_2$.

3. The extended-range fuel cell electric vehicle power device according to claim 1, wherein the power cell is a lithium ion cell.

4. A method for controlling an extended-range fuel cell electric vehicle power device, wherein when a given power Pin is positive, an electric vehicle works in a driving state, when the given power Pin is negative, the electric vehicle works in a braking state, an actual output power Pout of a driving motor drives the electric vehicle, a signal of the actual output power Pout of the driving motor is fed back to an input end and compared with the given power Pin to form a feedback control system, the signal of the Pout and a signal of the Pin are inputted into a comparator to obtain a power error signal ΔP, and differentiation processing is performed on the power error signal ΔP to obtain a power change rate signal dP/dt, and two controlled quantities $y_1$ and $y_2$ are obtained from the ΔP and the dP/dt by a control algorithm, wherein the controlled quantity $y_1$ controls an opening degree of an electric control valve, thus controlling an output electric power of a fuel cell; and the controlled quantity $y_2$ controls a PWM signal of a control port of a bidirectional converter, thus controlling a working mode and a power of the bidirectional converter.

5. The method for controlling the extended-range fuel cell electric vehicle power device according to claim 4, wherein the controlling the working mode of the bidirectional converter comprises controlling an inversion state when the electric vehicle works in the driving state and a rectification state when the electric vehicle works in the braking state; in the inversion state, the driving motor works in an electric state, and a power cell converts a direct current into an alternating current through the bidirectional converter to provide electric power for the driving motor; in the rectification state, the driving motor works in a power generation state and converts energy generated during braking of the electric vehicle into electric energy, and an alternating current generated by the driving motor is rectified into a direct current through the bidirectional converter to charge the power cell; and when a signal is generated by an accelerator pedal, the driving motor works in the power generation state, and when a signal is generated by a brake pedal, the driving motor works in the electric state.

6. The method for controlling the extended-range fuel cell electric vehicle power device according to claim 4, wherein the control algorithm which is a BP neural network control algorithm comprises the following steps of:

(1) establishing a structure of a BP neural network wherein a structure of the BP neural network is a 2-5-2 structure, which means that, a number of neurons in an input layer is that i=1,2, $x_i$ corresponds to two input variables, and the input layer is used for signal transmission;

the first input variable is: $x_1$:$\Delta P$;

the second input variable is: $x_2$:dP/dt;

a number of neurons in a middle layer is that j=1,2,3,4,5; and an input of the neurons in the middle layer is $x_j$ and an output of the neurons in the middle layer is $x'_j$;

a number of neurons in an output layer is that l=1,2 an input is $y_l$, and $y_l$ corresponds to two controlled quantities $y_1$ and $y_2$; and (2) training the BP network.

7. The method for controlling the extended-range fuel cell electric vehicle power device according to claim 6, wherein the step (2) comprises:

(21) forward propagation: calculating an output of the BP neural network, wherein the input of the neurons in the middle layer is a weighted sum of all the inputs, namely:

$$x_j = \sum_{i=1}^{2} \omega_{ij} x_i; \quad (1)$$

the output $x'_j$ of the neurons in the middle layer excites $x_j$ by using an S function to obtain:

$$x'_j = f(x_j) = \frac{1}{1+e^{-x}}; \quad (2)$$

then:

$$\frac{\partial x'_j}{\partial x_j} = x'_j(1-x'_j); \quad (3)$$

the output of the neurons in the output layer is that:

$$y_l = \sum_{j}^{5} \omega_{jl} x'_j; \quad (4)$$

an error between a $l^{th}$ output of the BP neural network and a corresponding ideal output $y_l^0$ is that:

$$e_l = y_l^0 - y_l \quad (5);$$

taking a $p^{th}$ sample as an example, an error performance index function of the $p^{th}$ sample is that:

$$E_p = \frac{1}{2}\sum_{l=1}^{5} e_l^2; \quad (6)$$

and

(22) backward propagation: adjusting weights among the layers by gradient descent, wherein a learning algorithm of a connection weight $\omega_{jl}$ between the output layer and the middle layer is that:

$$\Delta \omega_{jl} = -\eta \frac{\partial E_p}{\partial \omega_{jl}} = \eta e_l \frac{\partial x_l}{\partial \omega_{jl}} = \eta e_l x'_j; \quad (7)$$

wherein $\eta$ is a learning rate, $\eta \in [0,1]$; and $\Delta \omega_{jl}$ is a variation of the connection weight $\omega_{jl}$ between the output layer and the middle layer;

network weight at a moment k+1 is that:

$$\omega_{jl}(k+1) = \omega_{jl}(k) + \Delta \omega_{jl} \quad (8);$$

a learning algorithm of a connection weight $\omega_{ij}$ between the middle layer and the input layer is that:

$$\Delta \omega_{ij} = -\eta \frac{\partial E_p}{\partial \omega_{ij}} = \eta \sum_{l=1}^{5} e_l \frac{\partial x_l}{\partial \omega_{ij}}; \quad (9)$$

wherein $$\frac{\partial x_l}{\partial \omega_{ij}} = \frac{\partial x_l}{\partial x'_j} \cdot \frac{\partial x'_j}{\partial x_j} \cdot \frac{\partial x_j}{\partial \omega_{ij}} = \omega_{jl} \cdot \frac{\partial x'_j}{\partial x_j} \cdot x_i = \omega_{jl} \cdot x'_j(1-x'_j) \cdot x_i;$$

and $\Delta \omega_{ij}$ is a variation of the connection weight $\omega_{ij}$ between the middle layer and the input layer; and a network weight at a moment t+1 is that:

$$\omega_{ij}(k+1) = \omega_{ij}(k) + \Delta \omega_{ij} \quad (10).$$

* * * * *